United States Patent [19]

Schrader

[11] 4,166,682

[45] Sep. 4, 1979

[54] VIEWFINDER FOR COLLAPSIBLE CAMERA

[75] Inventor: Goetz Schrader, Frankfurt am Main, Fed. Rep. of Germany

[73] Assignee: Plaubel, Feinmechanik & Optik GmbH, Frankfurt am Main, Fed. Rep. of Germany

[21] Appl. No.: 831,266

[22] Filed: Sep. 7, 1977

[30] Foreign Application Priority Data

Sep. 8, 1976 [DE] Fed. Rep. of Germany ....... 2640435

[51] Int. Cl.$^2$ ............................................. G03B 17/04
[52] U.S. Cl. .................................... 354/187; 354/219
[58] Field of Search ............... 354/162, 187, 219, 224, 354/225

[56] References Cited

FOREIGN PATENT DOCUMENTS

| | | |
|---|---|---|
| 556215 | 8/1932 | Fed. Rep. of Germany ............ 354/219 |
| 646740 | 1/1936 | Fed. Rep. of Germany ............ 354/219 |
| 2062002 | 7/1972 | Fed. Rep. of Germany ............ 354/219 |
| 2362461 | 7/1975 | Fed. Rep. of Germany ............ 354/224 |

*Primary Examiner*—John Gonzales
*Attorney, Agent, or Firm*—Montague & Ross

[57] ABSTRACT

The top of the housing of a collapsible camera, connected by a scissor linkage with a relatively displaceable lens mount, has a cutout into which a viewfinder casing, swingable about a horizontal axis close to an upper lateral housing edge, is retracted in the collapsed state in which the lens mount enters the housing. A focusing knob on the housing controls the displacement of the extended lens mount, within an operating range, through a rack-and-pinion transmission engaging the scissor linkage; rotation of the knob beyond the "infinity" end of the operating range, preparatorily to a retraction of the lens mount into the camera housing, unblocks a latch serving to lock the viewfinder casing in its cutout. Return to the operating range automatically releases the latch and lets the spring-loaded casing jump out of the cutout to expose the viewfinder.

8 Claims, 3 Drawing Figures

VIEWFINDER FOR COLLAPSIBLE CAMERA

FIELD OF THE INVENTION

My present invention relates to photographic camera of the collapsible type whose housing, designed to accommodate a film to be exposed, is connected with a movable lens mount, carrying the exposure objective, through an extendible linkage allowing the distance of the objective from the film plane to be adjusted for focusing purposes by varying the separation of the lens mount from the housing. Generally, a bellows is inserted between the lens mount and the housing to form a light-tight enclosure between the objective and the film chamber.

BACKGROUND OF THE INVENTION

The considerable distance of the lens mount from the camera housing throughout the range of operating positions requires a certain lateral offsetting of a viewfinder from the optical axis of the lens system in order to afford an unobstructed view of the object to be photographed, especially if the lens mount is to be fitted with a front attachment such as a filter or a light shield. Since it is desirable to minimize the dimensions of the camera in its collapsed state, i.e. with the lens mount retracted into the housing, conventional viewfinders are foldable or hinged so as to be withdrawable from their extended working position. Even when thus withdrawn, however, they still project beyond the usually rectangular outline of the housing proper so that a carrying case for such a camera must be specially shaped to accommodate its viewfinder.

OBJECT OF THE INVENTION

The object of my present invention, therefore, is to provide an improved viewfinder construction which obviates this drawback.

SUMMARY OF THE INVENTION

In accordance with this invention, I provide a housing of a camera of the general type referred to with a peripheral cutout into which a substantially smaller casing is fully withdrawable; in a working position, a portion of the casing projects from the housing to expose a window in line with a viewfinder inside the casing. The viewfinder could also act as a distance meter and/or a photometer in a manner known per se.

Advantageously, the viewfinder casing is articulated to the housing so as to be swingable about a pivotal axis parallel to the optical axis of the associated objective. I prefer to place this pivotal axis in the immediate vicinity of a lateral edge of an upper housing surface with which a top surface of the viewfinder casing is flush in its withdrawn position.

According to another feature of my invention, the casing is spring-biased into its working position but is prevented by suitable retaining means from moving into that position as long as the camera is collapsed, the retaining means being controlled by a focusing mechanism which serves to adjust the axial distance of the lens mount from the camera housing within a range of operating positions. Such a focusing mechanism, coacting with an articulated linkage which connects the housing with the lens mount, has been described and claimed in my copending application Ser. No. 831,267 of even date whose disclosure is hereby incorporated by reference into the present application.

BRIEF DESCRIPTION OF THE DRAWING

The above and other features of my invention will now be described in detail with reference to the accompanying drawing in which.

SPECIFIC DESCRIPTION

Figure 1:
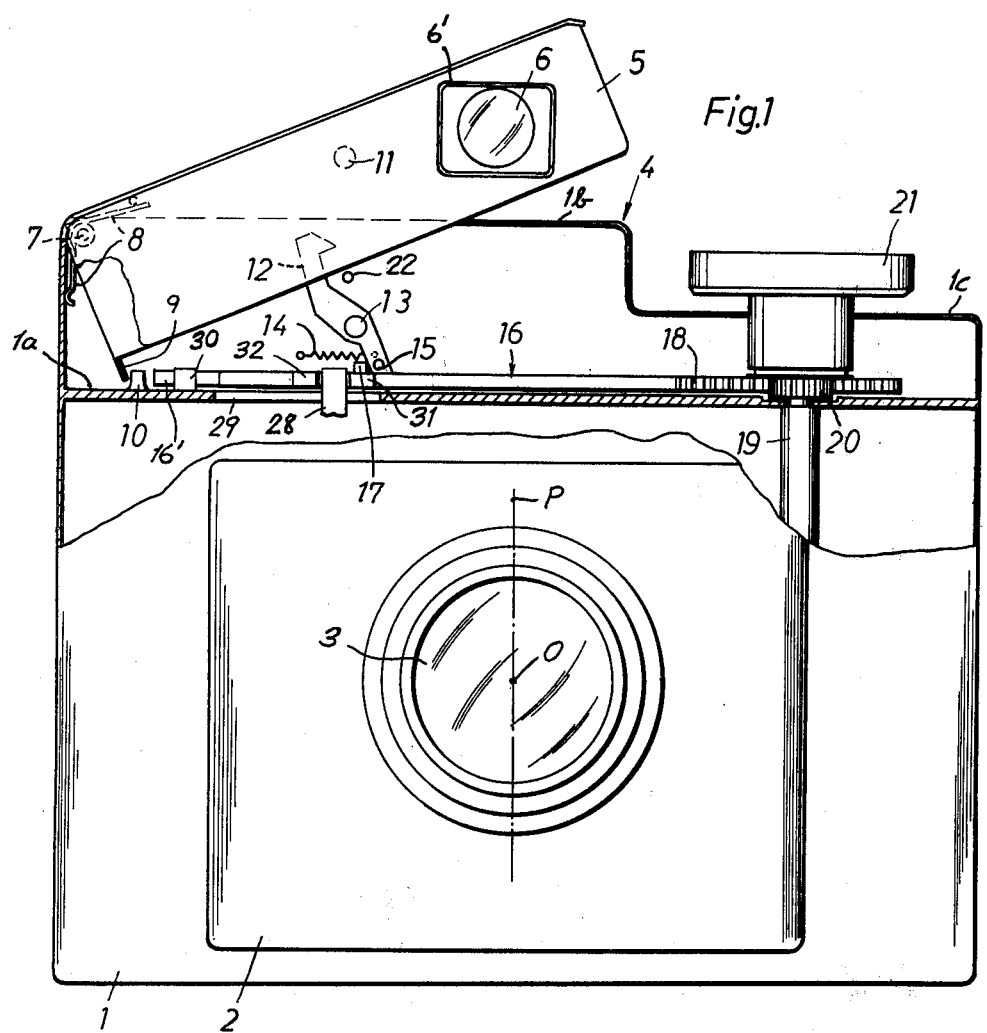
FIG. 1 is a somewhat diagrammatic front view, partly in section, of a collapsible camera according to my invention in picture-taking condition and with its viewfinder in working position.

The camera shown in the drawing is of the collapsible type described in my above-identified copending application. A housing 1, provided with the usual film-guiding mechanism not shown, is connected via a bellows 35 with a relatively movable lens mount 2 carrying an objective 3 whose optical axis has been indicated at O. The housing and the lens mount are mechanically coupled by an articulated linkage which consists of two pairs of scissor arms at the top and at the bottom of the camera, only the upper pair of arms 23, 24 being visible. Each of these arms, pivotally interconnected by a pin 25, has one end respectively fulcrumed at 26 to the housing 1 and at 27 to the lens mount 2. The other end of arm 23 carries a pin 33, guided in a slot 34 of lens mount 2, whereas the other end of arm 24 carries a pin 28 guided in a slot 29 of an internal wall 1a of housing 1.

The outer housing wall has a stepped upper surface with an upper level 1b and a lower level 1c. Level 1b has a rectangular cutout 4 in which a prismatic casing 5, containing a viewfinder 6, is pivotally mounted on an axle 7 lying close to the upper lateral housing edge. A hair-pin spring 8 tends to swing the casing 5 counterclockwise, as viewed in FIGS. 1 and 2, about axle 7 so as to lift the opposite extremity of the casing out of the cutout 4, that extremity having front and rear windows 6' and 6" in line with viewfinder 6. In the withdrawn position, shown in FIG. 2, these windows are obscured by the major housing walls and lie at an angle to the horizontal; in the working position of FIG. 1, the windows are level and are substantially bisected by a vertical plane P which includes the optical axis O.

Figure 2:
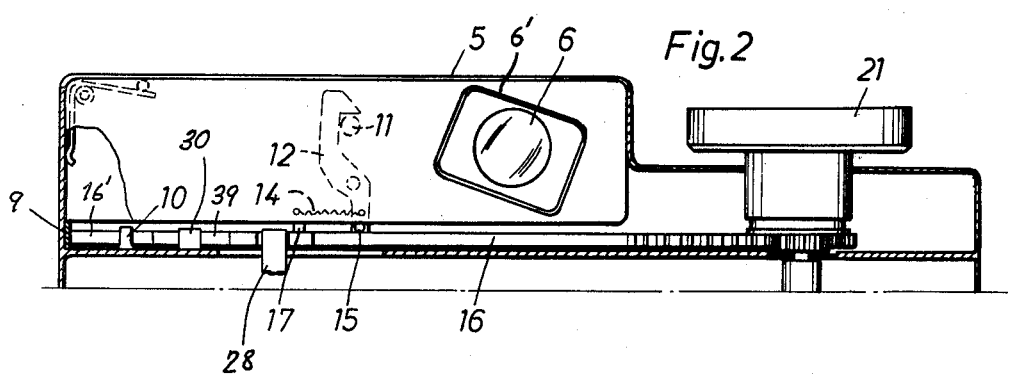
FIG. 2 is a partial front view of the camera of FIG. 1 with its viewfinder withdrawn.
Figure 3:
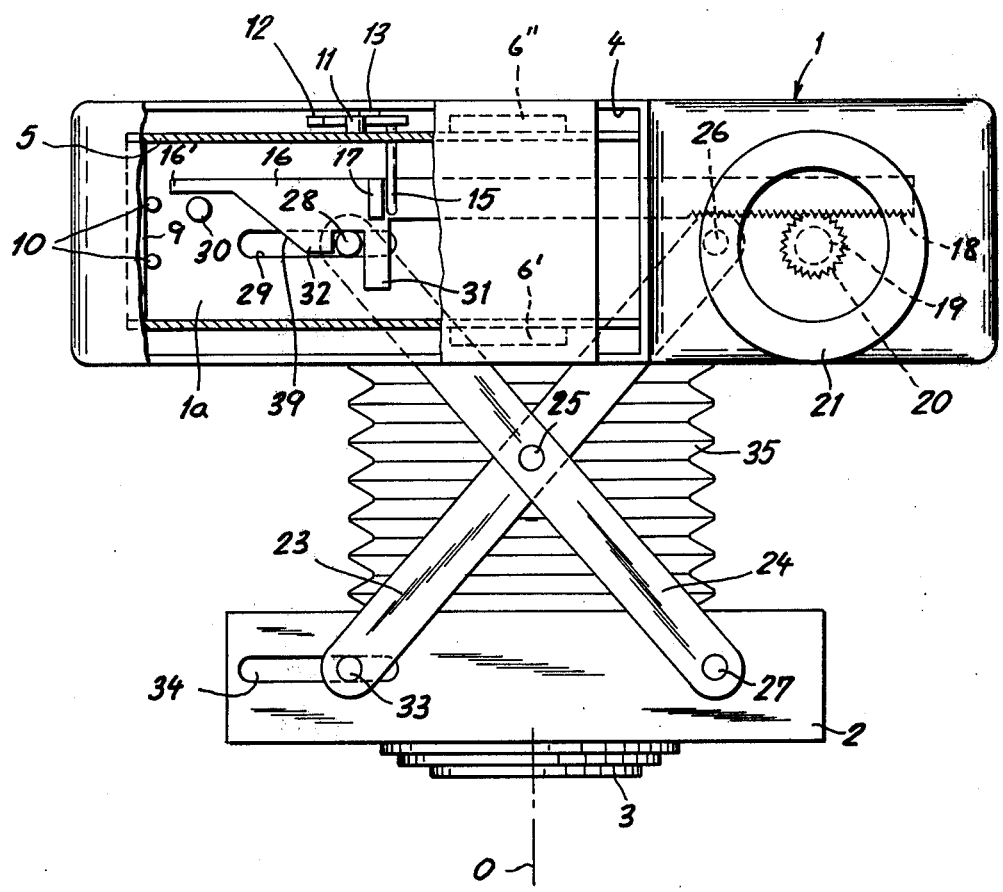
FIG. 3 is a top view, with parts broken away, of the camera in the position of FIG. 1.

An appendage 9 of viewfinder casing 5 abuts in FIGS. 1 and 3 a pair of fixed studs 10 serving to stop the casing in its working position. A peg 11 on casing 5 is engageable, in the withdrawn position of FIG. 2, by a hook-shaped detent 12 fulcrummed at 13 on the rear housing wall and urged by a spring 14 into a locking position in which it is arrested by a stud 22 on the same wall. When in that locking position, detent 12 snaps into engagement with peg 11 as soon as the casing 5 is lowered into the cutout 4 so that its top surface is flush with step 1b of the upper housing surface.

Detent 12 carries a pin 15 which overlies a rack member 16 having teeth 18 in mesh with an upper pinion 20 on a vertical shaft 19 traversing the housing 1, a nonillustrated lower pinion on the same shaft meshing with a similar rack member (not shown) near the bottom of the housing as more fully described in my copending application Ser. No. 831,267 referred to above. Shaft 19 carries a focusing knob 21 which projects above the lower level 1c of the upper housing wall but terminates short of the higher level 1b thereof so that the collapsed camera easily fits into a four-sided carrying case.

Each of the two rack members, as particularly illustrated for rack 16, is formed with two prongs 31, 32 which straddle the pin 28 of scissor arm 24 as long as knob 21 is in a position in which the two scissor links maintain the separation of lens mount 2 from housing 1 within a predetermined operating range whose proximal limit focuses the objective 3 on infinity whereas its distal limit allows for closeup shots. The knob is yieldably indexed in its infinity position but can be rotated therebeyond to shift the rack 16 further to the left; at that point a stud 30 on wall 1a engages a camming surface 39, constituting the outer flank of prong 32, to deflect the rack from its linear path against the force of a nonillustrated spring whereby the rack is decoupled from pin 28 which can thus freely advance to the left-hand end of its guide slot 29 as the user compresses the camera to retract the lens mount 2 into the housing 1. A nonillustrated latch may be activated at this point by the rack 16 to retain the lens mount within the housing, possibly against the force of a spring tending to re-extend it, as described and claimed in my copending application Ser. No. 831,272 of even date whose disclosure is likewise incorporated herewith by reference into the present application.

Rack 16 further carries a lug 17 which bears upon pin 15 of detent 12 and holds the latter in a nonlocking position as long as the transmission 16, 20 remains coupled to the linkage 23, 24. When that transmission is inoperative by reason of its decoupling from this linkage, as described above, lug 17 releases the pin 15 so that the detent 12 is free to assume its locking position illustrated in FIG. 2. When, with the viewfinder casing 5 locked within cutout 4, the user re-extends the lens mount 2 in order to take further pictures, the return of rack 16 to the position of FIG. 3 by a corresponding (clockwise) rotation of knob 21 brings the lug 17 again into contact with the pin 15 so as to deactivate the detent 12 whereupon the spring 8 automatically ejects the right-hand end of casing 5 from its cutout into the working position of FIG. 1.

As further shown in the drawing, rack 16 can be formed with an extension 16' bearing upon the appendage 9 of casing 5 so as to withdraw the casing into the position of FIG. 2 concurrently with the disengagement of the two racks from the corresponding scissor arms. Since the extension 16' keeps the casing withdrawn in the collapsed state of the camera, detent 12 could be omitted in that instance. The presence of this detent, however, insures that the viewfinder will not be exposed until the knob 21 has been turned to at least the "infinity" position of the focusing range.

I claim:

1. In a camera having a housing and a lens mount with an objective centered on an optical axis, said lens mount being connected with said housing by an articulated linkage and being widely separated from said housing along said axis in a range of operating positions, the combination therewith of:

a casing fully receivable in a peripheral cutout of said housing in a withdrawn position and movable from said cutout into a working position, said casing being articulated to said housing for swinging about a pivotal axis substantially paralleling said optical axis, a portion of said casing being provided with a window projecting from said housing in said working position;

focusing means on said housing engageable with said linkage for axially displacing said lens mount in said range of operating positions, said focusing means being movable into an inoperative position with disengagement of said linkage to facilitate a retraction of said lens mount into said housing;

retaining means operatively coupled with said focusing means for holding said casing in its withdrawn position during said disengagement; and a viewfinder in said casing in line with said window.

2. The combination defined in claim 1 wherein said housing is generally prismatic and has an upper surface provided with said cutout, said casing having a top surface which is substantially flush with said upper surface in said withdrawn position and terminates at a lateral edge of said upper surface, said pivotal axis lying close to said lateral edge.

3. The combination defined in claim 2 wherein said portion is an extremity of said casing remote from said pivotal axis, said window being substantially bisected in said working position by a vertical plane including said optical axis.

4. The combination defined in claim 1 wherein said focusing means comprises a rack member movable substantially at right angles to said optical axis, said casing being provided with spring means biasing same into said working position, said retaining means coacting with said rack member to maintain said spring means ineffectual during said disengagement.

5. The combination defined in claim 4 wherein said retaining means comprises a detent on said housing engageable with said casing for locking same in said withdrawn position, said rack member being provided with a blocking formation holding said detent in a nonlocking position during engagement of said focusing means with said linkage.

6. The combination defined in claim 4 wherein said retaining means comprises an extension on said rack member engageable with a part of said casing upon movement into said inoperative position for swinging said casing into said withdrawn position.

7. The combination defined in claim 4 wherein said focusing means further comprises a rotatable knob and a pinion coupled with said knob in mesh with said rack member, said cutout being located in an elevated part of a stepped surface of said housing, said knob rising from a depressed part of said stepped surface to not more than the level of said elevated part.

8. The combination defined in claim 4 further comprising stop means on said housing for preventing a swinging of said casing past said working position by said spring means.

* * * * *